(12) United States Patent
Kurashita (10) Patent No.: US 6,352,006 B1
(45) Date of Patent: Mar. 5, 2002

(54) REDUCTION GEAR FOR VEHICLE SEAT

(75) Inventor: Takashi Kurashita, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 09/438,477

(22) Filed: Nov. 12, 1999

(51) Int. Cl.[7] .................................. F16H 55/18
(52) U.S. Cl. ................. 74/409; 74/425; 297/330; 297/344.17
(58) Field of Search .................. 74/409, 411, 416, 74/425, 427; 297/330, 344.17

(56) References Cited

U.S. PATENT DOCUMENTS

| | | |
|---|---|---|
| 3,469,469 A | 9/1969 | Burger |
| 3,583,253 A * | 6/1971 | Grimshaw et al. ............ 74/425 |
| 3,848,477 A * | 11/1974 | Giandinoto et al. .......... 74/425 |
| 4,040,307 A * | 8/1977 | Koster .......................... 74/425 |
| 4,621,933 A * | 11/1986 | Musso ......................... 400/555 |
| 5,794,480 A | 8/1998 | Schöensteiner |

FOREIGN PATENT DOCUMENTS

| | | |
|---|---|---|
| DE | 196 31 228 A | 2/1998 |
| EP | 0 871 280 A | 10/1998 |

* cited by examiner

Primary Examiner—David Fenstermacher
(74) Attorney, Agent, or Firm—Smith Patent Office (57) ABSTRACT

A reduction gear for a vehicle seat is provided with a worm (7) connected to an end of a drive shaft (31a) and formed integrally with and on a common axis with a threaded portion (71) of the worm (7), a worm wheel (8) formed on a common axis with an output shaft (82b) and meshed with the worm (7), and a casing (6) rotatably supporting the worm (7) and the worm wheel (8) meshed with each other. The casing (6) has a worm fitting sleeve (62) for accommodating the worm (7), and the worm fitting sleeve (62) incorporates a leaf spring (9) which pushes the worm (7) in its axial direction with an extreme end of the worm (7) held in contact with the leaf spring (9).

6 Claims, 8 Drawing Sheets

REDUCTION GEAR FOR VEHICLE SEAT

BACKGROUND OF THE INVENTION

1. Field of the Invention

This invention relates to a reduction gear for use in a seat of a vehicle for reducing the rotating speed of a drive shaft connected to a prime mover and transmitting its rotary motion to an output shaft.

2. Discussion of the Related Art

Figure 9:
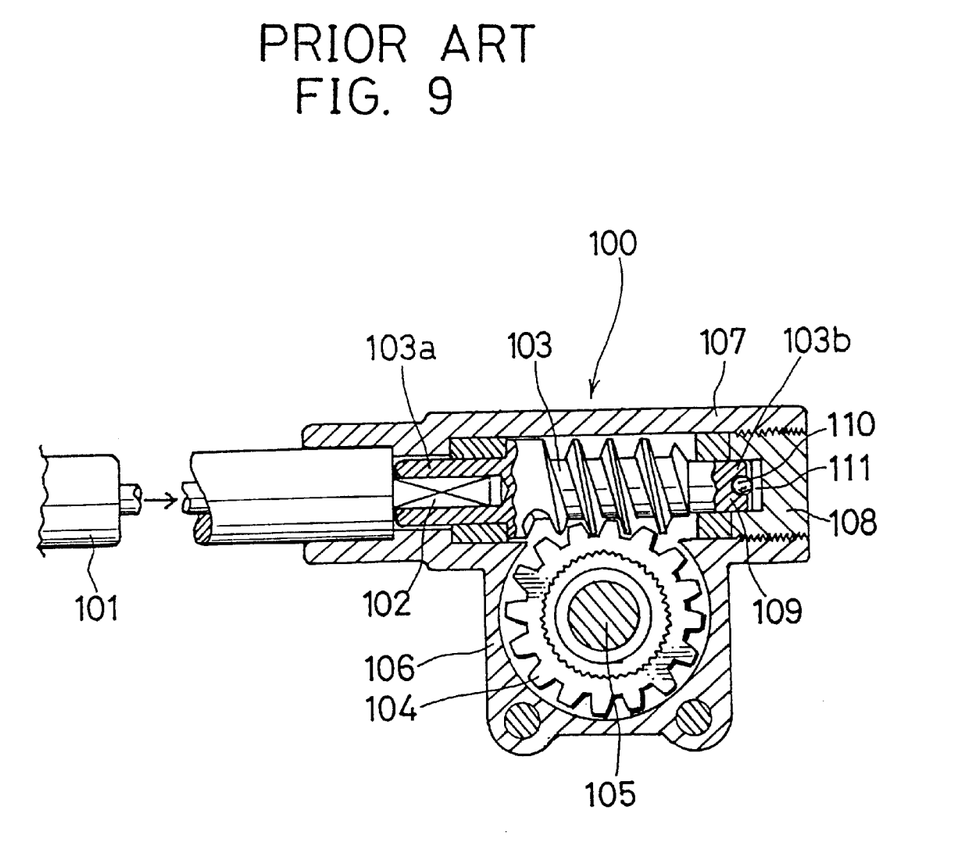
FIG. 9 is an explanatory diagram illustrating a conventional reduction gear.

Shown in FIG. 9 is a conventionally known reduction gear 100 suited for use in a power seat of a vehicle, for example. This reduction gear 100 comprises as its basic constituent elements a worm 103 formed integrally with an inner shaft 103a which is coaxially connected to the end of a drive shaft 102 of a driving motor 101, a worm wheel 104 engaged with the worm 103, an output shaft 105 combined integrally with the worm wheel 104 which is formed concentrically around the curved outer surface of the output shaft 105, and a casing 106 in which the worm 103 and the worm wheel 104 are fitted.

The casing 106 is provided with a tubular housing 107 accommodating the worm 103, and a cylindrical bearing plug 108 for rotatably supporting the extreme end of the drive shaft 102 is fitted into a terminal end (right end in FIG. 9) of the tubular housing 107. There is formed a shaft-supporting hole 109 in an inner end surface of the cylindrical bearing plug 108 on a common axis with the drive shaft 102. The inner diameter of the shaft-supporting hole 109 is made slightly larger than the outer diameter of an outer shaft 103b of the worm 103 so that the extreme end of the worm 103 is rotatably fitted into the shaft-supporting hole 109.

Further, a small hole is made in an end surface of the outer shaft 103b, and a steel ball 110 is fitted concentrically in the small hole with part of the steel ball 110 protruding outward from the small hole. On the other hand, a washer 111 is fitted at the bottom of the shaft-supporting hole 109, and the worm 103 is allowed to rotate smoothly with the washer 111 held in contact with the steel ball 110.

In the reduction gear 100 thus constructed, the rotary motion of the driving motor 101 is transmitted to the worm 103, and the rotation of the worm 103 is transmitted to the worm wheel 104, causing the worm wheel 104 to turn at a reduced rotating speed. Since the rotating speed of the worm wheel 104 is reduced, the output shaft 105 turns at a lower speed than the drive shaft 102.

In the aforementioned conventional reduction gear 100, variations in the length of the worm 103 are compensated by adjusting the length of thread engagement of the cylindrical bearing plug 108 and by elastic deformation of the washer 111 which is in contact with the steel ball 110. However, the amount of elastic deformation of the washer 111 could be smaller than the amount of variations in the length of the worm 103 and, thus, the reduction gear 100 has a problem that it might not be able to fully compensate for dimensional variations of the worm 103. It is therefore necessary to improve the accuracy of the length of the worm 103 and this would result in an increase in manufacturing cost.

Further, the length of thread engagement between the cylindrical bearing plug 108 and the tubular housing 107 is apt to vary due to vibrations or other causes. Therefore, the cylindrical bearing plug 108 could loosen in a long run, causing the steel ball 110 at the extreme end surface of the worm 103 to be separated from the washer 111, even though the end of the outer shaft 103b of the worm 103 is securely supported by the cylindrical bearing plug 108 immediately after assembly. Thus, there arises a problem that the worm 103 would become shaky in its axial direction. When this has happened, it is necessary to readjust the thread engagement of the cylindrical bearing plug 108 by tightening it, which is quite inconvenient for users.

Furthermore, since three components including the cylindrical bearing plug 108, the steel ball 110 and the washer 111 are required for rotatably supporting the extreme end of the worm 103, the conventional reduction gear 100 entails high component costs and complex assembly operation. This poses another problem that the efficiency of assembly work is relatively low.

1. Field of the Invention

SUMMARY OF THE INVENTION

It is an object of the invention to provide a reduction gear for a vehicle seat which has overcome the aforementioned problems in the prior art.

According to an aspect of the invention, a reduction gear for a vehicle seat, comprises a worm connectable with an end of a drive shaft of a driver, a worm wheel meshed with the worm and connectable with an output shaft, and a casing for rotatably supporting the worm and the worm wheel. The casing is formed with a hollow cylindrical portion for accommodating the worm, and provided with a resilient member for urging the worm toward the drive shaft.

Other features of the present invention will be more readily understood from the following detailed description when read in conjunction with accompanying drawings.

BRIEF DESCRIPTION OF THE DRAWINGS

FIGS. 6A and 6B are cross-sectional diagrams illustrating the operation of the sliding motor reduction gear, wherein FIG. 6A shows a condition in which a large force is not exerted on a leaf spring, and FIG. 6B shows a condition in which a large force is exerted on the leaf spring;

DETAILED DESCRIPTION OF THE PREFERRED EMBODIMENTS

Figure 1:
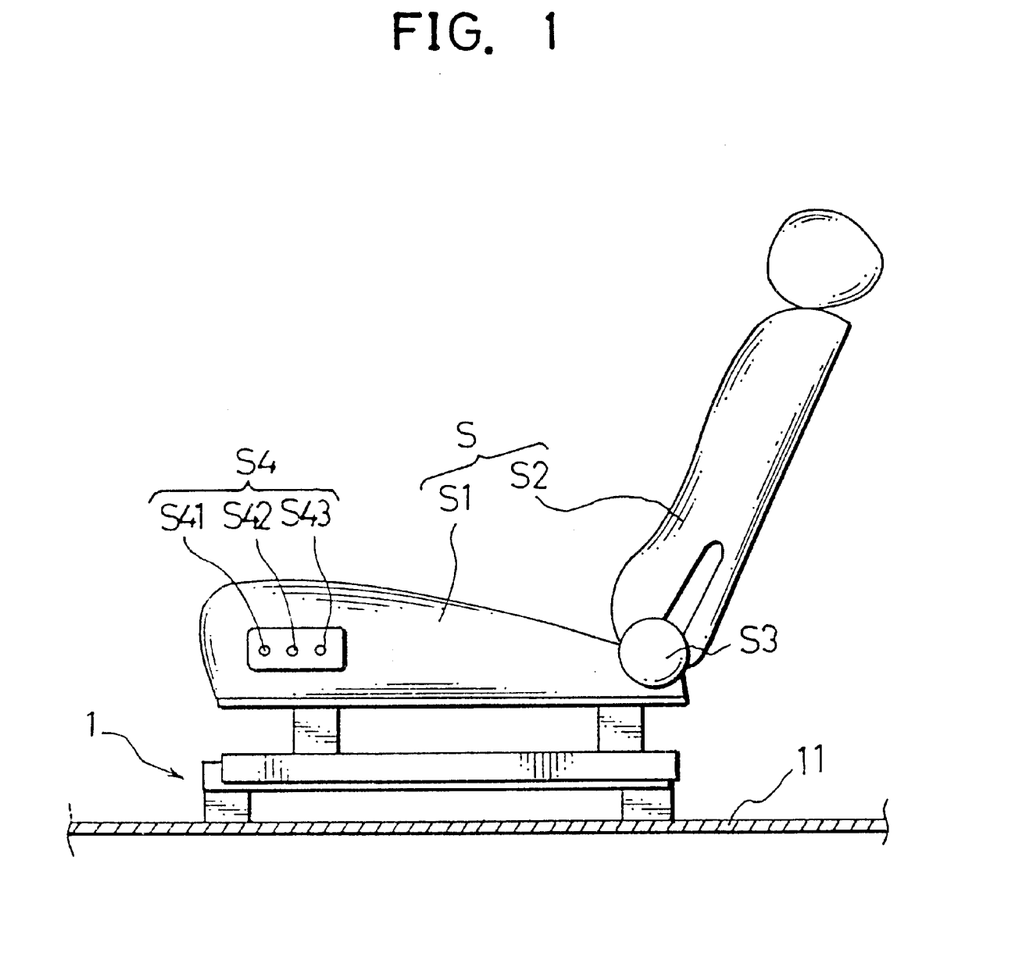
FIG. 1 is a side view showing a power seat of a vehicle incorporating reduction gears according to an embodiment of the invention.

FIG. 1 is a side view showing a power seat S of a vehicle incorporating reduction gears according to an embodiment of the invention. As depicted in FIG. 1, the seat S comprises a seat bottom S1 on which a vehicle occupant is seated and a seatback S2 erected from the rear end (right side as shown in FIG. 1) of the seat bottom S1. There is provided a pair of recliners S3 between the rear end of the seat bottom S1 and the bottom end of the seatback S2, the two recliners S3 arranged laterally (that is, in the direction perpendicular to the page of FIG. 1). The vehicle occupant can adjust the seatback S2 between its extreme forward tilting position and extreme rearward reclining position by operating the recliners S3. In FIG. 1, the seatback S2 is set in its upright position (ordinary sitting position) which is located between the forward tilting position and the reclining position.

The seat bottom S1 is mounted on a seat positioning assembly 1 which is installed on a floor 11 in a passenger space. Driven by the seat positioning assembly 1, the seat S can slide back and forth (left and right as depicted in FIG. 1), or the seat bottom S1 can be inclined by raising or lowering either its front or rear end. Therefore, the seat S can be arbitrarily adjusted to positions best suited to the physical makeup of individual vehicle occupants within limits of specified ranges.

A switch panel S4 for controlling the seat positioning assembly 1 is provided at an appropriate position on one side surface of the seat bottom S1. This switch panel S4 incorporates three switches. These are a seat slide switch S41 which causes the seat S to slide longitudinally (back and forth), a front up/down switch S42 which is used to raise or lower the front end of the seat bottom S1, and a rear up/down switch S43 which is used to raise or lower the rear end of the seat bottom S1. The vehicle occupant can adjust the seat S to the desired position by operating these switches S41–S43.

Figure 2:
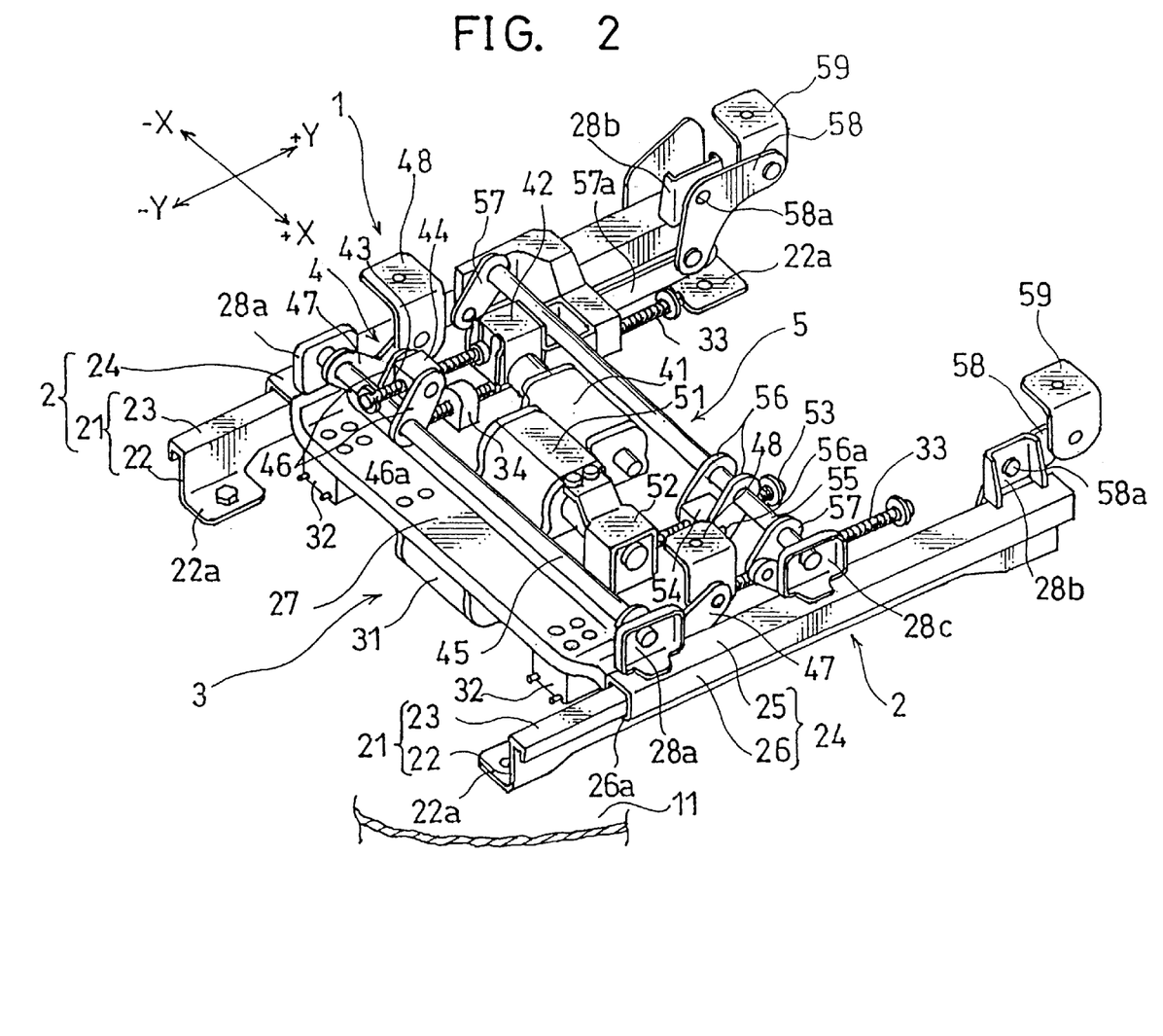
FIG. 2 is a perspective view of a seat positioning assembly of the power seat incorporating the reduction gears according to the embodiment.

FIG. 2 is a perspective view of the seat positioning assembly 1 incorporating the reduction gears according to the present embodiment of the invention. In this Figure, the lateral direction of the seat S is represented by an X axis while the longitudinal direction of the seat S is represented by a Y axis, wherein the negative side of the X axis (−X direction) corresponds to the left side of the seat S, the positive side of the X axis (+X direction) corresponds to the right side, the negative side of the Y axis (−Y direction) corresponds to the front side, and the positive side of the Y axis (+Y direction) corresponds to the rear side. As illustrated in FIG. 2, the seat positioning assembly 1 of the power seat S comprises as its basic constituent elements a pair of seat slides 2 which are mounted on the floor 11 on both sides of the seat S. Other basic constituent elements of the seat positioning assembly 1, which are all supported by the slides 2, are a seat sliding mechanism 3, a front up/down mechanism 4 and a rear up/down mechanism 5.

The left and right seat slides 2 each include a lower rail 21 which is bolted to the floor 11 and extends parallel to the longitudinal direction of the seat S and an upper rail 24 which is fitted on top of the lower rail 21 in such a way that the upper rail 24 can slide back and forth along the lower rail 21.

The lower rails 21 are individually shaped like an inverted J in front view, each lower rail 21 having an upright rail leg 22 extending in the longitudinal direction at a lower part and a rail plate 23 extending longitudinally along the upper edge of the rail leg 22. Further, each rail leg 22 has a pair of bolting flanges 22a formed by bending tab-like projections at front and rear terminal parts at right angles. Each lower rail 21 is securely fixed to the floor 11 as bolts B passed through holes made in the bolting flanges 22a and through corresponding holes made in the floor 11 are fastened with nuts.

Each upper rail 24 has a top plate 25 extending in the longitudinal direction to fit on the corresponding rail plate 23 and a pair of side plates 26 extending downward from both side edges of the top plate 25. Lower edges of the individual side plates 26 of each upper rail 24 are bent to form longitudinally extending retaining claws 26a which are pointing inward toward each other. Each upper rail 24 thus constructed is generally C-shaped in front view.

When the rail plate 23 is fitted into an inner space of the upper rail 24 with the rail leg 22 located between the inward directed retaining claws 26a of the upper rail 24, the upper rail 24 can slide in the longitudinal direction relative to the lower rail 21. A spanning plate 27 is fixed to front portions of the two upper rails 24, whereby the paired upper rails 24 located side by side are joined to each other and they can slide together back and forth, guided by the two lower rails 21.

The top plate 25 of each upper rail 24 is provided with a front bracket 28a projecting upward from a front end part of the upper rail 24 and a rear bracket 28b projecting upward from a rear end part of the upper rail 24. The seat bottom S1 which is not shown in FIG. 2 is supported by these front and rear brackets 28a, 28b. Further, each upper rail 24 is provided with a central bracket 28c projecting upward from approximately the middle of the length of the top plate 25. The central bracket 28c serves to support part of the rear up/down mechanism 5.

The aforementioned seat sliding mechanism 3 comprises a sliding motor 31 fixed to the bottom surface of the spanning plate 27, left and right sliding motor reduction gears 32 for reducing the rotating speed of the sliding motor 31, longitudinally extending left and right slide screw shafts 33 which rotate at a speed reduced by the individual sliding motor reduction gears 32, and left and right slide screw guide nuts 34 which are fixed to the floor 11 and meshed with the respective slide screw shafts 33.

The sliding motor 31 attached to the spanning plate 27 has two drive shafts individually extending in the +X and −X directions (left and right) as illustrated in FIG. 2, and a worm (spirally-cut thread) is formed on an outer terminal part of each drive shaft. On the other hand, each sliding motor reduction gear 32 incorporates a worm wheel which is formed integrally with and on a common axis with the slide screw shaft 33 and that meshes with the worm on each drive shaft of the sliding motor 31. In this construction, when the sliding motor 31 turns in its forward or reverse direction, the worms on the individual drive shafts of the sliding motor 31 rotate, and this causes the left and right slide screw shafts 33 meshed with the slide screw guide nuts 34 to rotate in their forward or reverse direction, respectively. As a consequence, the upper rails 24 slide forward or rearward along the respective lower rails 21 and the seat S moves accordingly.

The aforementioned front up/down mechanism 4 comprises a front up/down motor 41 which is installed on the floor 11 between the left and right seat slides 2 approximately at the middle of their length but closer to the left-hand seat slide 2, a front up/down motor reduction gear 42 for reducing the rotating speed of the front up/down motor 41, a longitudinally extending front up/down screw shaft 43 which rotates at a speed reduced by the front up/down motor reduction gear 42, and a front lift nut 44 engaged with the front up/down screw shaft 43.

On the other hand, a laterally extending frontal horizontal shaft 45 is fitted rotatably about its own axis between the left and right front brackets 28a attached to the seat slides 2, and a pair of frontal crank arms 46 laterally arranged side by side are securely mounted on the frontal horizontal shaft 45, holding the front lift nut 44 in between. The front lift nut 44 is mounted rotatably on a laterally extending shaft 46a which is supported between the paired frontal crank arms 46. Thus, when the front up/down screw shaft 43 turns in its forward or reverse direction, the front lift nut 44 moves in the forward or rear direction, and this longitudinal movement of the front lift nut 44 is transmitted to the frontal horizontal shaft 45 via the shaft 46a and the frontal crank arms 46, causing the frontal horizontal shaft 45 to turn in its forward or reverse direction.

Front portions of a pair of frontal L link plates 47 each having an L shape are fixed to both lateral ends of the frontal horizontal shaft 45, and a pair of front support brackets 48 for supporting the frontal part of the seat bottom S1 are swingably attached to rear portions of the left and right frontal L link plates 47. The front up/down motor reduction gear 42 is constructed in substantially the same way as the aforementioned sliding motor reduction gears 32. Thus, when the front up/down motor 41 turns in its forward or reverse direction, the front up/down screw shaft 43 is caused to turn in its forward or reverse direction via the front up/down motor reduction gear 42. Consequently, the front lift nut 44 is caused to move in the forward or rear direction. As already described above, this longitudinal movement of the front lift nut 44 is transmitted to the frontal horizontal shaft 45 via the shaft 46a and the frontal crank arms 46, causing the frontal horizontal shaft 45 to turn in its forward or reverse direction. As the frontal horizontal shaft 45 turns in its forward or reverse direction in this fashion, the front support brackets 48 ascend or descend as a result of swinging motion of the frontal L link plates 47, causing the front end of the seat bottom S1 to ascend or descend.

The aforementioned rear up/down mechanism 5 comprises a rear up/down motor 51 which is installed on the floor 11 between the left and right seat slides 2 approximately at the middle of their length just between the front up/down motor 41 and the frontal horizontal shaft 45, a rear up/down motor reduction gear 52 for reducing the rotating speed of the rear up/down motor 51, a longitudinally extending rear up/down screw shaft 53 which rotates at a speed reduced by the rear up/down motor reduction gear 52, and a rear lift nut 54 engaged with the rear up/down screw shaft 53.

On the other hand, a laterally extending central horizontal shaft 55 is fitted rotatably about its own axis between the left and right central brackets 28c attached to the seat slides 2, and a pair of rear crank arms 56 laterally arranged side by side are firmly mounted on the central horizontal shaft 55, holding the rear lift nut 54 in between. The rear lift nut 54 is mounted rotatably on a laterally extending shaft 56a which is supported between the paired rear crank arms 56. Thus, when the rear up/down screw shaft 53 turns in its forward or reverse direction, the rear lift nut 54 moves in the forward or rear direction, and this longitudinal movement of the rear lift nut 54 is transmitted to the central horizontal shaft 55 via the shaft 56a and the rear crank arms 56, causing the central horizontal shaft 55 to turn in its forward or reverse direction.

Upper ends of a pair of straight link plates 57 extending generally downward are fixed to both lateral ends of the central horizontal shaft 55, while middle parts of a pair of horizontally extending rear L link plates 58 each having an L shape are mounted on left and right support shafts 58a such that the rear L link plates 58 can swing about the respective support shafts 58a. Lower ends of the left and right rear L link plates 58 are linked to lower ends of the left and right straight link plates 57 by respective connecting rods 57a in such a way that these connecting rods 57a can swing about shafts individually fixed to the rear L link plates 58 and the straight link plates 57. With this arrangement, when the straight link plates 57 swing in their forward or reverse direction about the central horizontal shaft 55, the rear L link plates 58 swing synchronously about their support shafts 58a. A pair of rear support brackets 59 for supporting the rear part of the seat bottom S1 are swingably attached to rear ends of the left and right rear L link plates 58. The rear up/down motor reduction gear 52 is constructed in substantially the same way as the aforementioned sliding motor reduction gears 32.

In this construction, when the rear up/down motor 51 turns in its forward or reverse direction, the rear up/down screw shaft 53 is caused to turn in its forward or reverse direction via the rear up/down motor reduction gear 52. Consequently, the rear lift nut 54 is caused to move in the forward or rear direction. As already described above, this longitudinal movement of the rear lift nut 54 is transmitted to the central horizontal shaft 55 via the shaft 56a and the rear crank arms 56, causing the central horizontal shaft 55 to turn in its forward or reverse direction. As the central horizontal shaft 55 turns in its forward or reverse direction in this fashion, the rear support brackets 59 are caused to ascend or descend via the connecting rods 57a and the rear L link plates 58, causing the rear end of the seat bottom S1 to ascend or descend.

Figure 3:
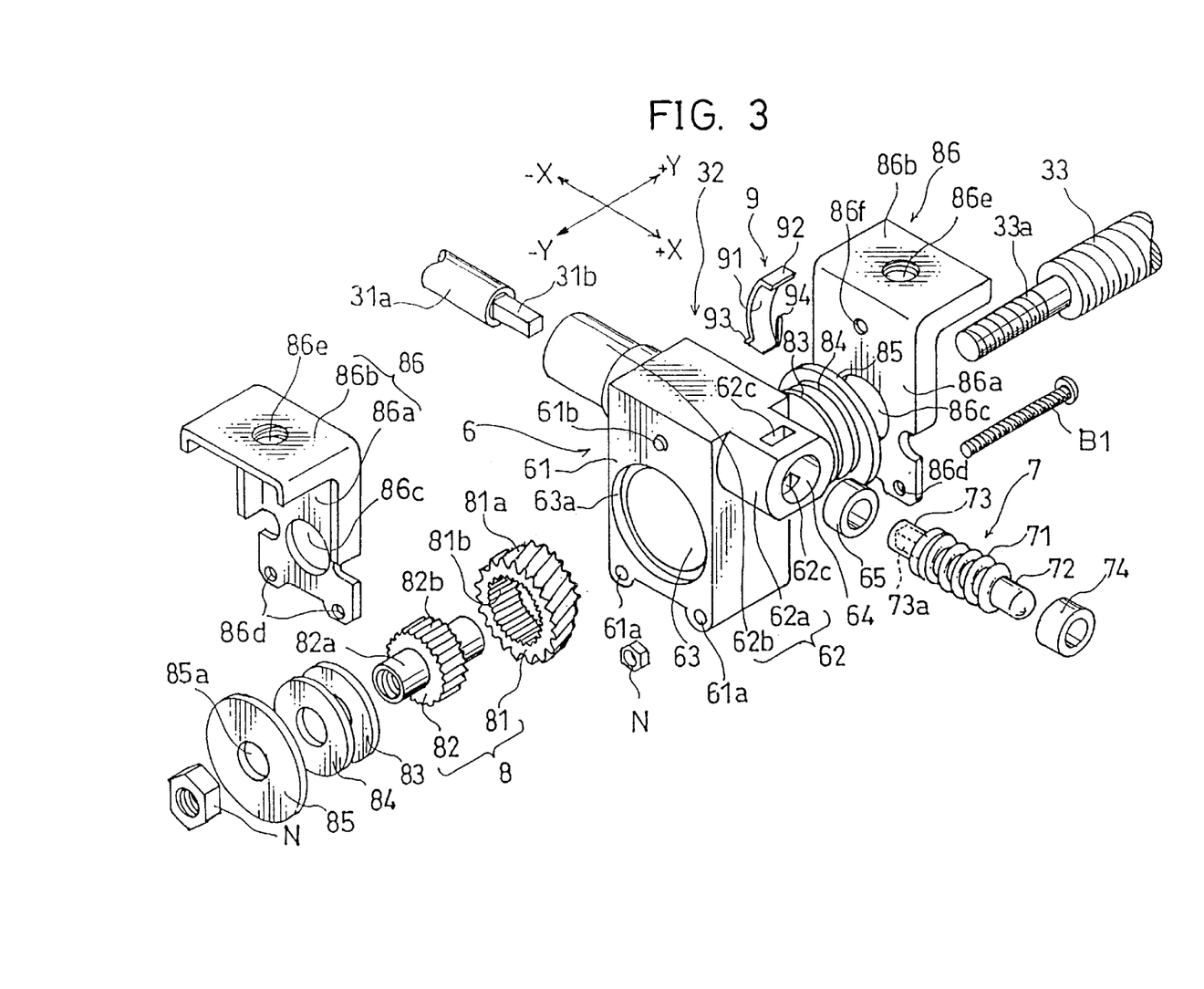
FIG. 3 is an exploded perspective view showing a sliding motor reduction gear according to the embodiment.
Figure 4:
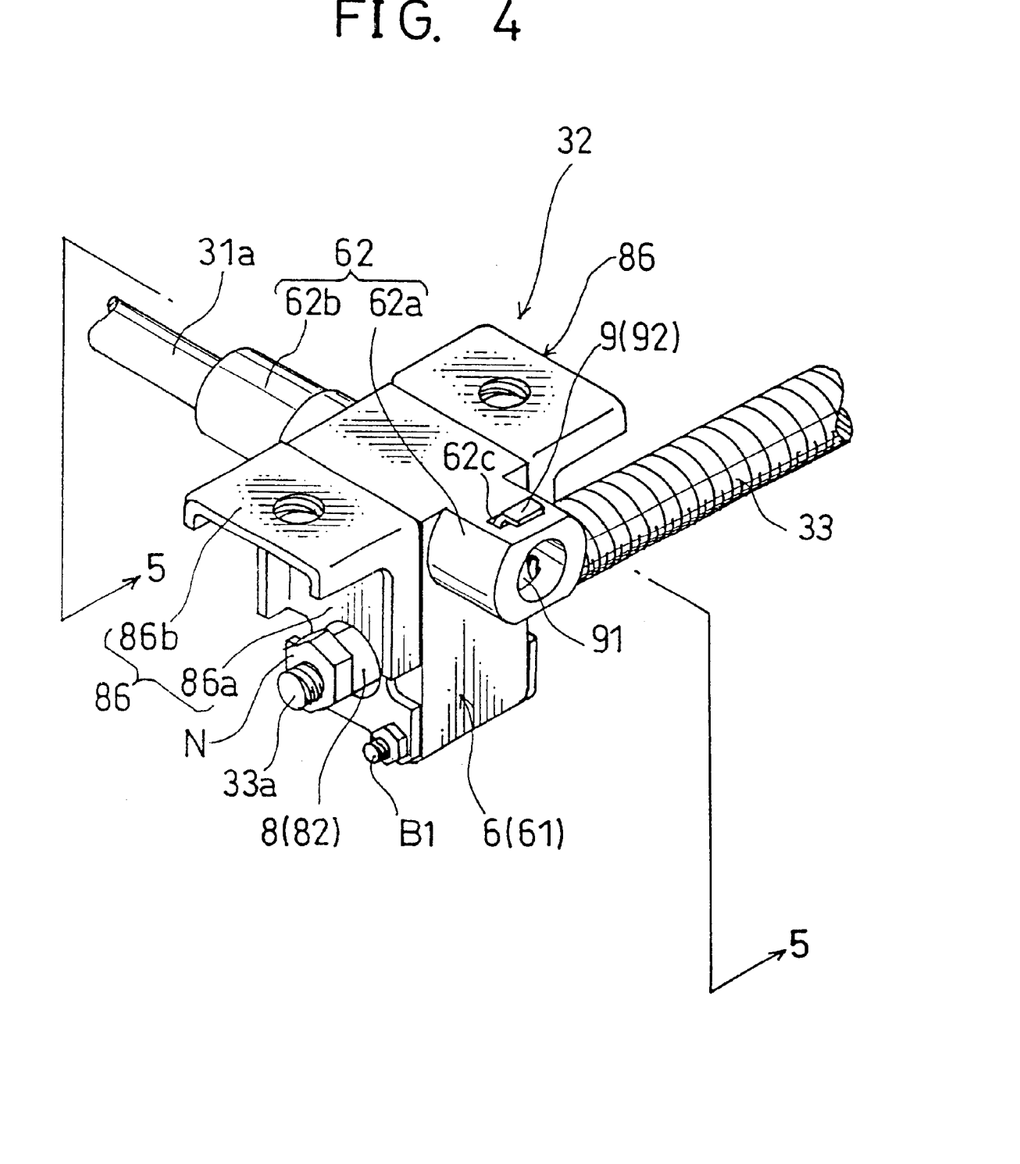
FIG. 4 is a perspective assembly diagram of the sliding motor reduction gear of FIG. 3.
Figure 5:
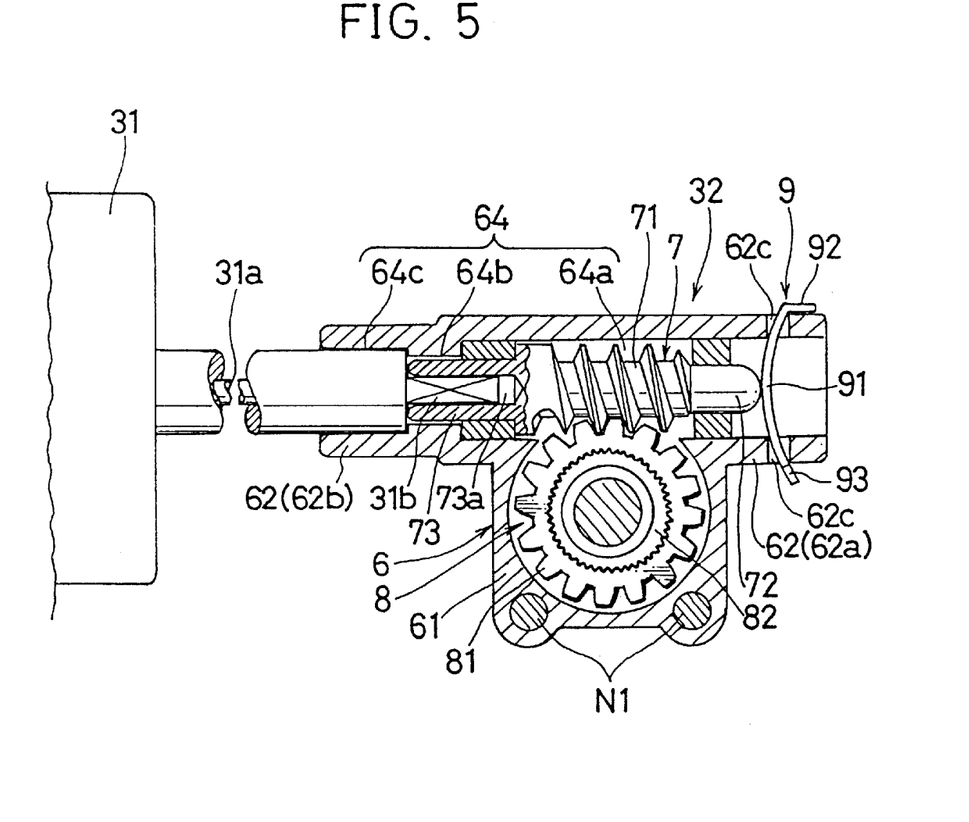
FIG. 5 is a cross-sectional diagram taken along the line 5—5 in FIG. 4.

As shown in the foregoing discussion, the present embodiment of the invention incorporates three types of reduction gears, that is, the sliding motor reduction gears 32, the front up/down motor reduction gear 42 and the rear up/down motor reduction gear 52 of the seat positioning assembly 1 depicted in FIG. 2. The invention is now described in further detail, by way of example, with reference to the sliding motor reduction gears 32. FIG. 3 is an exploded perspective diagram showing one of the sliding motor reduction gears 32, FIG. 4 is a perspective assembly diagram of the sliding motor reduction gear 32 of FIG. 3, and FIG. 5 is a cross-sectional diagram taken along lines 5—5 of FIG. 4.

As can be seen from these Figures, the sliding motor reduction gear 32 comprises as its basic constituent elements a boxlike casing 6, a worm 7 incorporated in the casing 6, a worm wheel 8 also incorporated in the casing 6 and a leaf spring 9 detachably fitted in the casing 6.

The casing 6 of the sliding motor reduction gear 32 is made up of a casing body 61 and a pair of end covers 86 attached to front and rear surfaces of the casing body 61. The casing 6 forms a single structure with the casing body 61 sandwiched between the front and rear end covers 86. The casing body 61 has a laterally extending worm fitting sleeve 62 which is formed as an integral part of the casing body 61 at its upper part for accommodating the worm 7, and a longitudinally extending circular worm wheel fitting hole 63 formed in a lower part of the casing body 61 to hold the worm wheel 8. There are formed stepped holes 63a having a slightly larger diameter than the worm wheel fitting hole 63 along the periphery of both front and rear openings of the worm wheel fitting hole 63. The worm fitting sleeve 62 has a right-hand cylindrical portion 62a projecting rightward from a right side surface of the casing body 61 and a left-hand cylindrical portion 62b projecting leftward from a left side surface of the casing body 61. These cylindrical portions 62a, 62b are formed as if embedded into the casing body 61 to make a single structure.

The worm fitting sleeve 62 has a laterally extending worm fitting hole 64 in which the worm 7 is fitted. As illustrated in FIG. 5, the worm fitting hole 64 is made up of a large-diameter cavity 64a extending from the outer end surface of the right-hand cylindrical portion 62a toward the left-hand cylindrical portion 62b, a small-diameter cavity 64b formed at the left of the large-diameter cavity 64a and a medium-diameter cavity 64c formed at the left of the small-diameter cavity 64b.

The inner diameter of the large-diameter cavity 64a is made slightly larger than the outer diameter of the worm 7. The worm 7 is fitted into the large-diameter cavity 64a, with a synthetic resin bushing 65 already inserted all the way into the large-diameter cavity 64a, wherein the bushing 65 has a slightly smaller outer diameter than the diameter of the large-diameter cavity 64a. The worm 7 is set in position as it comes into contact with the bushing 65 at the leftward position within the large-diameter cavity 64a.

The large-diameter cavity 64a is formed such that its middle portion is connected to the worm wheel fitting hole 63 and that the worm wheel 8 meshes with the worm 7 when fitted in the worm wheel fitting hole 63.

The inner diameter of the worm wheel fitting hole 63 is made slightly larger than the outer diameter of the worm wheel 8 so that the worm wheel 8 can be fitted into the worm wheel fitting hole 63 leaving a narrow gap between the worm wheel 8 and the inner surface of the worm wheel fitting hole 63.

The worm 7 has a threaded portion 71 formed by spirally cutting its outer surface, an outer shaft 72 projecting rightward from the right end of the threaded portion 71 on a common axis with it, and an inner shaft 73 projecting leftward from the left end of the threaded portion 71 on a common axis with it. The extreme end of the outer shaft 72 is formed into a hemispherical shape. This hemispherical portion of the outer shaft 72 comes into contact with the leaf spring 9 which is fitted in the right-hand cylindrical portion 62a of the worm fitting sleeve 62.

The inner shaft 73 has a square hole 73a formed from an outer end surface of the inner shaft 73 in its axial direction. On the other hand, an outer terminal portion of a drive shaft 31a of the sliding motor 31 forms a square bar 31b that fits into the square hole 73a in the inner shaft 73. As the square bar 31b is inserted into the square hole 73a, the drive shaft 31a of the sliding motor 31 and the worm 7 are connected to each other so that they can turn together about their common axis.

Further, a bearing ring 74 made of a high-strength synthetic resin like polytetrafluoroethylene is slidably mounted over the outer shaft 72. The outer diameter of this bearing ring 74 is made slightly smaller than the diameter of the large-diameter cavity 64a.

The worm wheel 8 includes a ring-shaped worm wheel element 81 made of a synthetic resin and a metallic supporting wheel 82 which is fitted into the worm wheel element 81 so that they can turn together about their common axis. The outer diameter of the worm wheel element 81 is made slightly smaller than the inner diameter of the worm wheel fitting hole 63, and external teeth 81a that mesh with the worm 7 are formed on the cylindrical outer surface of the worm wheel element 81. In addition, internal splines 81b are cut in the cylindrical inner surface of the worm wheel element 81, while external splines 82b that mesh with the internal splines 81b are formed around the cylindrical outer surface of the supporting wheel 82. When the external splines 82b and the internal splines 81b are meshed together, the worm wheel element 81 and the supporting wheel 82 are combined and they can turn together about their common axis.

The supporting wheel 82 has a pair of sleevelike shafts (output shafts) 82a projecting frontward and rearward from its front and rear end surfaces. On the other hand, the slide screw shaft 33 has a threaded shank 33a which projects frontward from its front end on a common axis with the slide screw shaft 33 itself. With this threaded shank 33a fitted into the sleevelike shafts 82a of the supporting wheel 82, a nut N is screwed onto the threaded shank 33a, whereby the worm wheel 8 is joined to the slide screw shaft 33 as shown in FIG. 4.

The worm wheel 8 is fitted in the worm wheel fitting hole 63 with a ring-shaped metallic disc 83 whose outer diameter is slightly larger than that of the supporting wheel 82, a ring-shaped synthetic resin disc 84 having the same shape as the metallic disc 83 and a ring-shaped bearing disc 85 mounted in this order on each of the sleevelike shafts 82a projecting frontward and rearward from the supporting wheel 82.

Here, the outer diameter of the front and rear bearing discs 85 is made slightly smaller than the inner diameter of the stepped holes 63a while the inner diameter of the bearing discs 85 is made large enough to fit on the sleevelike shaft 82a in sliding contact. Therefore, when the worm wheel 8 is fitted in the worm wheel fitting hole 63, it is sandwiched between the front and rear metallic discs 83, resin discs 84 and bearing discs 85.

With the worm wheel 8 fitted in the worm wheel fitting hole 63 and sandwiched between the front and rear discs 83–85 as explained above, the casing 6 is held between the front and rear end covers 86. When the front and rear end covers 86 are joined to the casing 6 by tightening the nut N with the casing 6 held in between, the worm wheel 8 is enclosed within the casing 6.

Each of the end covers 86 has a vertical plate 86a and a horizontal plate 86b which is formed by bending an upper part of the vertical plate 86a. Approximately at the middle of each vertical plate 86a, there is made a hole 86c in which each sleevelike shaft 82a of the supporting wheel 82 is loosely fitted. Further, a pair of laterally aligned bolt holes 86d are made in each vertical plate 86a below the hole 86c. On the other hand, a pair of deep bolt holes 61a are made in the casing body 61 near its lower corners (left and right), wherein the location of the bolt holes 61a matches that of the bolt holes 86d. With the casing body 61 sandwiched between the two end covers 86, elongate bolts B1 are inserted into the bolt holes 86d, 61a and fastened by fitting nuts N onto the individual bolts B1, whereby the front and rear end covers 86 are firmly attached to the casing 6.

Further, a circular projection 86f is formed at an upper position of a surface of the vertical plate 86a of each end cover 86 that comes face to face with the casing body 61. On the other hand, a circular hole 61b is made in each contact surface of the casing body 61 at its upper position corresponding to the circular projection 86f. As the circular projections 86f of the front and rear end covers 86 fit into the circular holes 61b in the casing body 61 when they are assembled, it is possible to positively prevent lateral displacement of the end covers 86 relative to the casing body 61.

At the middle of each horizontal plate 86b, there is made a threaded hole 86e. The sliding motor reduction gear 32 is fixed to the spanning plate 27 by screwing unillustrated bolts into the threaded holes 86e in the horizontal plates 86b of the individual end covers 86.

In this invention, a pair of slitlike leaf spring mounting holes 62c extending in the longitudinal direction are formed in the top and bottom of the right-hand cylindrical portion 62a of the casing 6. The leaf spring 9 is fitted between the top and bottom leaf spring mounting holes 62c as shown in FIG. 5.

Referring to FIG. 3, the leaf spring 9 has an arc-shaped spring portion 91, a stopping part 92 formed by bending an upper end of the spring portion 91 approximately at right angles thereto, a stopping claw 93 projecting from a lower part of one side edge of the spring portion 91, and a needlelike projection 94 extending upward from the opposite side edge of the spring portion 91, wherein the stopping claw 93 has the shape of an inverted right-angled triangle.

The width of the spring portion 91 (as measured along the Y axis shown in FIG. 3) is made smaller than the length (longitudinal dimension) of each leaf spring mounting hole 62c, and the distance (vertical dimension) between the bottom surface of the stopping part 92 and the upper edge of the stopping claw 93 is made approximately equal to the distance between the outer edges of the top and bottom leaf spring mounting holes 62c. Therefore, when the leaf spring 9 is inserted from the upper leaf spring mounting hole 62c into the lower leaf spring mounting hole 62c, the stopping part 92 comes into contact with the top surface of the right-hand cylindrical portion 62a, and the needlelike projection 94, which is elastically deformed, passes through the lower leaf spring mounting hole 62c. At this point, the leaf spring 9 is set in position in the right-hand cylindrical portion 62a.

When the leaf spring 9 has been fitted in the right-hand cylindrical portion 62a as described above, the side edge of the spring portion 91 on the side of the stopping claw 93 is forced against an edge of the lower leaf spring mounting hole 62c due to a pushing force exerted by the elastically deformed needlelike projection 94. As a result, the upper edge of the stopping claw 93 hooks onto the edge of the lower leaf spring mounting hole 62c. Thus, it is possible to positively keep the leaf spring 9 from coming off the spring mounting holes 62c. The radius of curvature of the spring portion 91 of the leaf spring 9 is determined such that the hemispherical end of the outer shaft 72 of the worm 7 comes into contact with the spring portion 91 when the worm 7 is fitted in the worm fitting sleeve 62.

Figure 6A:
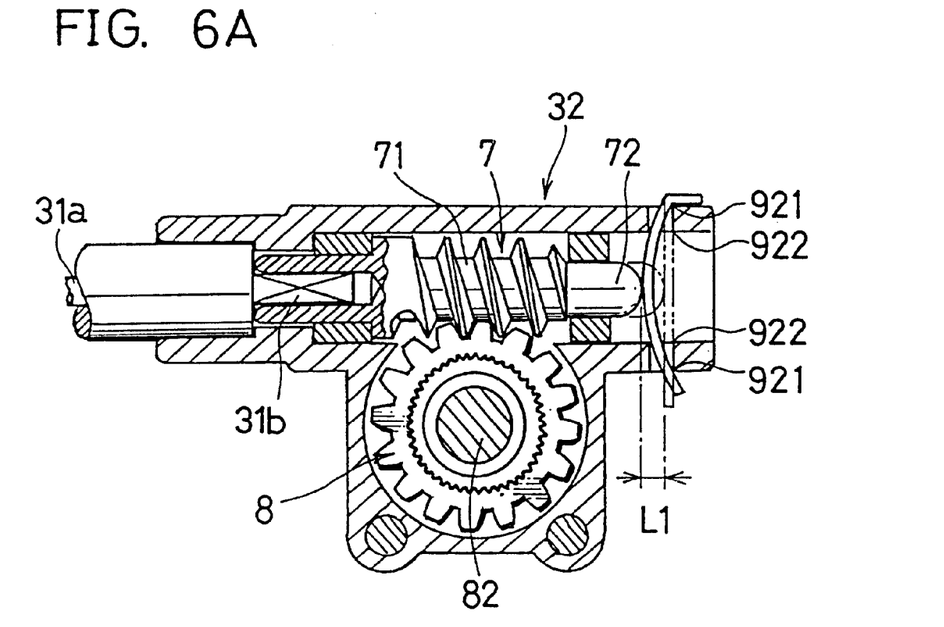
Figure 6B:
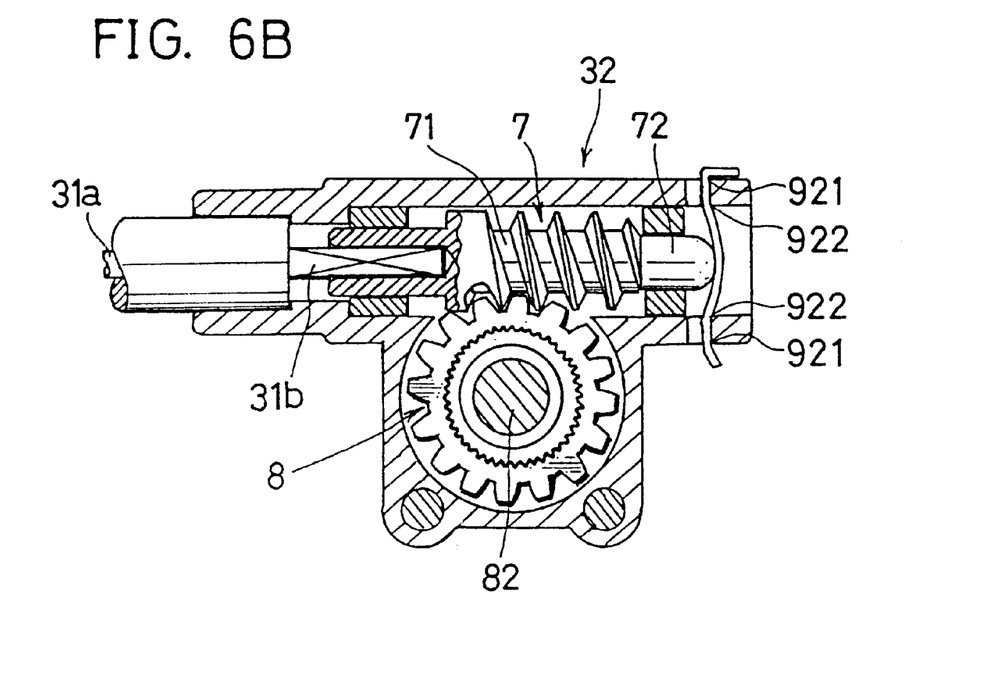
Figure 7:
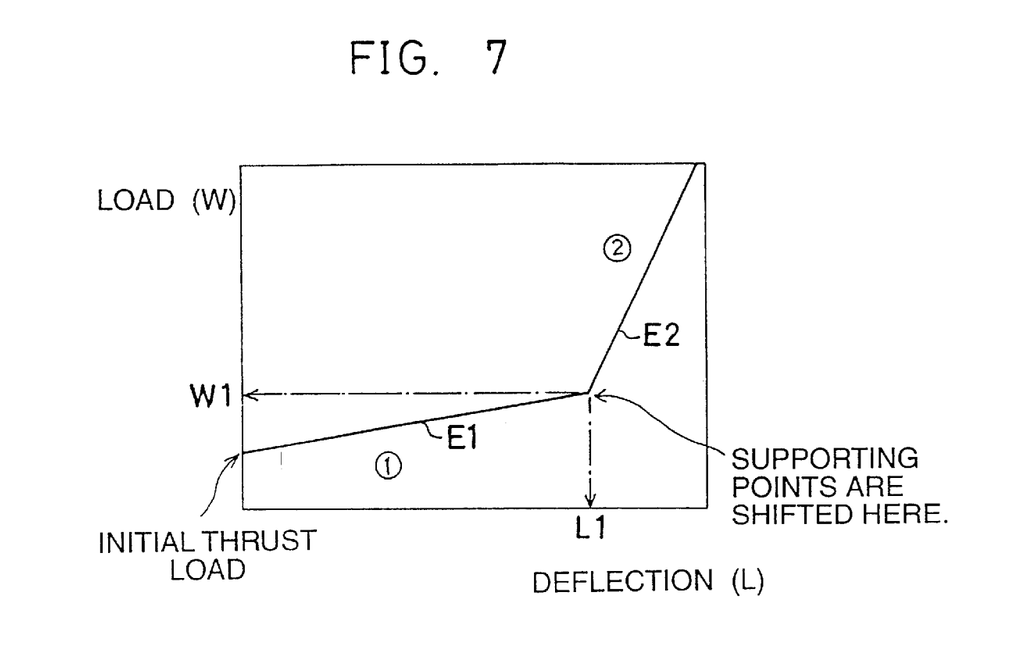
FIG. 7 is a graph showing a relationship between the amount of deflection (L) of the leaf spring and the amount of load (W) applied to the leaf spring.

FIGS. 6A and 6B are cross-sectional diagrams illustrating the operation of the sliding motor reduction gear 32, wherein FIG. 6A shows a condition in which a large force is not exerted on the leaf spring 9, and FIG. 6B shows a condition in which a large force is exerted on the leaf spring 9. FIG. 7 is a graph showing a relationship between the amount of deflection (L) of the leaf spring 9 and the amount of load (W) applied to the leaf spring 9.

When the worm 7 does not exert a large force upon the leaf spring 9, the outer shaft 72 of the worm 7 is pushed leftward due to a pushing force exerted by the elastically deformed leaf spring 9, as shown in FIG. 6A. This means that the worm 7 is properly positioned in the casing 6 with good stability in this condition without using the conventional cylindrical bearing plug 108 (FIG. 9). As the worm 7 exerts a pushing force on the leaf spring 9, the leaf spring 9 is elastically deformed, with outer edges 921 of the top and bottom leaf spring mounting holes 62c working as supporting points. In this condition, the amount of deflection (L) of the leaf spring 9 increases in proportion to the amount of load (W) applied to the leaf spring 9 at a specific constant of proportionality (i.e., spring constant E1) until the amount of deflection (L) reaches L1 (FIG. 6A), as shown by a straight line (1) of FIG. 7. While the amount of deflection (L) remains within a range of 0 to L1, the leaf spring 9 serves to compensate for variations in the length of the worm 7, or of the drive shaft 31a.

When the amount of deflection (L) of the leaf spring 9 reaches L1, the supporting points for the leaf spring 9 shift from the outer edges 921 of the leaf spring mounting holes 62c to their inner edges 922 as shown in FIG. 6B. Consequently, the effective length of the leaf spring 9 decreases and its spring constant changes from E1 to E2 correspondingly, where E2 is larger than E1. In this condition, the leaf spring 9 becomes more difficult to bend as shown by a straight line (2) of in FIG. 7, and the leaf spring 9 can work effectively when a greater load is applied.

Figure 8:
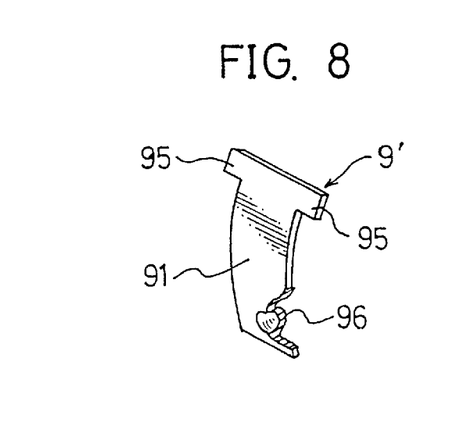
FIG. 8 is a partially cutaway perspective view of a leaf spring in one variation of the embodiment of the invention.

FIG. 8 is a partially cutaway perspective view of a leaf spring 9' in one variation of the foregoing embodiment. This leaf spring 9' has a pair of stopping tabs 95 jutting out widthwise along the upper edge of its spring portion 91 and a stopping projection 96 formed at a lower central part by stamping operation instead of the earlier-mentioned stopping part 92 and stopping claw 93, respectively. When the leaf spring 9' thus constructed is fitted in the leaf spring mounting hole 62c in the worm fitting sleeve 62, the stopping tabs 95 and the stopping projection 96 hook in the leaf spring mounting hole 62c. Thus, the leaf spring 9' is securely held in the leaf spring mounting hole 62c in a reliable fashion.

As described above, the inventive reduction gear for a vehicle seat, comprises: a worm which is connectable with an end of a drive shaft of a driver; a worm wheel which is meshed with the worm and is connectable with an output shaft; and a casing which rotatably supports the worm and the worm wheel, the casing having a hollow cylindrical portion for accommodating the worm, and being provided with a resilient member for urging the worm toward the drive shaft.

In this reduction gear for a vehicle seat, the extreme end of the worm comes into contact with the resilient member which is fitted in the hollow cylindrical portion of the casing, and a pushing force is exerted on the worm due to the resilient member when the worm is fitted in the hollow cylindrical portion. This arrangement positively prevents vibration of the worm within the casing and variations in the length of the worm are compensated by the resilient member. Therefore, it is possible to prevent the conventional problem of worm vibration even when the accuracy of the length of the worm or the accuracy of the relative mounting position of the driver and the casing is somewhat poor. In addition, as requirements for the accuracy of the worm length and for assembling accuracy become less stringent than in the prior art, it is possible to achieve a reduction in product and assembly costs. Further, a reduction in the number of components contributes to cutting component costs.

It may be preferable that the resilient member is a leaf spring provided in the hollow cylindrical portion and held in contact with an outer end surface of the worm. The hollow cylindrical portion may be preferably formed with holes in radially opposite locations for holding the leaf spring. The leaf spring may be preferably arc-shaped and fitted in the holes in such a way that a convex surface of the leaf spring comes into contact with the outer end surface of the outer shaft.

The leaf spring is inserted from one leaf spring mounting hole into the other, whereby the leaf spring traverses the hollow cylindrical portion all the way along its diameter. Since the effective length of the leaf spring of this arrangement can be made larger than the diameter of the conventionally used washer, the amount of variations in the length of the worm that can be compensated by the leaf spring is increased correspondingly.

When the worm exerts a pushing force on the convex surface of the leaf spring, the arc-shaped leaf spring initially deflects with outer edges of the two leaf spring mounting holes initially serving as supporting points for the leaf spring. In this condition, the effective length of the leaf spring is equal to the outside diameter of the hollow cylindrical portion of the casing. When the force applied to the leaf spring increases and the amount of deflection of the leaf spring increases beyond a specified point, inner edges of the leaf spring mounting holes serve as supporting points for the leaf spring. As a result, the effective length of the leaf spring decreases and its pushing force remarkably increases. The pushing force of the leaf spring is switched between two different ranges depending on the force exerted by the worm as discussed above. When the worm applies a larger load on the leaf spring, the pushing force of the leaf spring increases correspondingly to properly sustain the increased load.

Further, the leaf spring may be preferably formed with a stopper at its terminal part. With this arrangement, the leaf spring once fitted in the leaf spring mounting holes is locked into position by the stopper so that it will not accidentally come off the hollow cylindrical portion of the casing.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A reduction gear for a vehicle seat, the reduction gear comprising:

a worm which is connectable with an end of a drive shaft of a driver;

a worm wheel which is meshed with the worm and is connectable with an output shaft; and a casing which rotatably supports the worm and the worm wheel, the casing having a hollow cylindrical portion for accommodating the worm; and a leaf spring fixedly mounted and passing thru the hollow cylindrical portion for urging the worm toward the drive shaft;

wherein an extreme end of the worm has such a shape as to come into substantially point contact with the resilient member.

2. A reduction gear for a vehicle seat according to claim 1, wherein the extreme end of the worm has a hemispherical shape.

3. A reduction gear for a vehicle seat according to claim 1, wherein the hollow cylindrical portion is formed with holes in radially opposite locations for holding the leaf spring.

4. A reduction gear for a vehicle seat according to claim 1, wherein the leaf spring has a stopper at a lower central portion of the leaf spring.

5. A reduction gear for a vehicle seat, the reduction gear comprising:

a worm which is connectable with an end of a drive shaft of a driver;

a worm wheel which is meshed with the worm and is connectable with an output shaft; and a casing which rotatably supports the worm and the worm wheel, the casing having a hollow cylindrical portion for accommodating the worm, and being provided with a resilient member for urging the worm toward the drive shaft;

wherein the resilient member includes a leaf spring provided in and passing thru the hollow cylindrical portion and held in contact with an outer end surface of the worm;

the hollow cylindrical portion is formed with holes in radially opposite locations for holding the leaf spring; and the leaf spring is arc-shaped and fitted in the holes in such a way that a convex surface of the leaf spring comes into contact with the outer end surface of the worm.

6. A reduction gear for a vehicle seat according to claim 5, wherein the leaf spring has a stopper at an end part thereof.

* * * * *